United States Patent
Nakai

(10) Patent No.: US 9,292,078 B2
(45) Date of Patent: Mar. 22, 2016

(54) IMAGE FORMING APPARATUS, CONTROL METHOD THEREFOR, AND STORAGE MEDIUM

(71) Applicant: CANON KABUSHIKI KAISHA, Tokyo (JP)

(72) Inventor: Hironobu Nakai, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 421 days.

(21) Appl. No.: 13/827,817

(22) Filed: Mar. 14, 2013

(65) Prior Publication Data

US 2013/0268790 A1    Oct. 10, 2013

(30) Foreign Application Priority Data

Apr. 5, 2012 (JP) .................................. 2012-086850

(51) Int. Cl.
*G06F 1/32* (2006.01)

(52) U.S. Cl.
CPC ............ *G06F 1/3284* (2013.01); *G06F 1/3228* (2013.01); *G06F 1/3246* (2013.01); *Y02B 60/1267* (2013.01)

(58) Field of Classification Search
CPC .............. G06F 1/32; G06F 1/26; G06F 1/28; G06F 1/3284; G06F 1/3246; Y02B 60/1267
USPC ......... 713/300, 310, 320, 321, 322, 323, 324, 713/330, 340, 375
See application file for complete search history.

(56) References Cited

U.S. PATENT DOCUMENTS

| | | | |
|---|---|---|---|
| 5,619,412 A * | 4/1997 | Hapka | .............................. 701/36 |
| 2002/0033157 A1* | 3/2002 | Thompson et al. | ......... 123/179.4 |
| 2005/0198643 A1* | 9/2005 | Lachelt et al. | ................. 718/106 |
| 2005/0223150 A1* | 10/2005 | Ohmoto et al. | ............... 710/309 |
| 2007/0288154 A1* | 12/2007 | Letang | ........................... 701/112 |
| 2011/0036699 A1* | 2/2011 | Daffin, III | .............. H01H 43/10 200/38 A |

FOREIGN PATENT DOCUMENTS

JP    2007-079925 A    3/2007

* cited by examiner

*Primary Examiner* — Jaweed A Abbaszadeh
*Assistant Examiner* — Keshab Pandey
(74) *Attorney, Agent, or Firm* — Fitzpatrick, Cella, Harper & Scinto

(57) ABSTRACT

An image forming apparatus stores, in a storage unit, the number of extensions, which is the number of times an automatic shutdown time can be extended, and an extension time period by which the automatic shutdown time can be extended. Upon receiving a set request for requesting extension of the automatic shutdown from an external apparatus, the image forming apparatus enables settings of the received set request when the received set request satisfies conditions regarding the number of extensions and the extension time period, and disables the settings of the received set request when the set request does not satisfy the conditions regarding the number of extensions and the extension time period.

10 Claims, 12 Drawing Sheets

FIG. 3

SETTINGS OF WEEKLY TIMER

| DAY | SUNDAY | MONDAY | TUESDAY | WEDNESDAY | THURSDAY | FRIDAY | SATURDAY |
|---|---|---|---|---|---|---|---|
| TIME | UNSET | 18:00 | 23:00 | 18:00 | 22:00 | 19:00 | UNSET |

301 302 303 304

AUTOMATIC SHUTDOWN TIME PERIOD ~305

- NOT EXECUTED
- 1 HOUR
- 2 HOURS
- 3 HOURS
→ 4 HOURS
- 5 HOURS
- 6 HOURS
- 7 HOURS
- 8 HOURS

FIG. 7

EXAMPLE OF SET REQUEST

| NUMBER OF TIMES SET REQUEST HAS BEEN RECEIVED | SET EXTENSION TIME PERIOD (MINUTES) | NUMBER OF TIMES OF EXTENSION (REMAINING) | EXTENSION TIME PERIOD (REMAINING) (MINUTES) | |
|---|---|---|---|---|
| 0 | - | 10 | 60 | INITIAL STATE |
| 1 | 10 | 9 | 50 | |
| 2 | 10 | 8 | 40 | |
| 3 | 10 | 7 | 30 | |
| 4 | 0 | 7 | 30 | |

FIG. 8

EXAMPLE OF SET REQUEST THAT SETS EXTENSION TIME PERIOD
EXCEEDING REMAINING EXTENSION TIME PERIOD

| NUMBER OF TIMES SET REQUEST HAS BEEN RECEIVED | SET EXTENSION TIME PERIOD (MINUTES) | NUMBER OF TIMES OF EXTENSION (REMAINING) | EXTENSION TIME PERIOD (REMAINING) (MINUTES) | |
|---|---|---|---|---|
| 0 | - | 10 | 60 | INITIAL STATE |
| 1 | 15 | 9 | 45 | |
| 2 | 30 | 8 | 15 | |
| 3 | 10 | 7 | 5 | |
| 4 | 10 | 7 | 5 | ERROR |

FIG. 9

EXAMPLE OF SET REQUEST RECEIVED AFTER REMAINING NUMBER
OF TIMES OF EXTENSION HAS REACHED ZERO

| NUMBER OF TIMES SET REQUEST HAS BEEN RECEIVED | SET EXTENSION TIME PERIOD (MINUTES) | NUMBER OF TIMES OF EXTENSION (REMAINING) | EXTENSION TIME PERIOD (REMAINING) (MINUTES) | |
|---|---|---|---|---|
| 0 | - | 3 | 60 | INITIAL STATE |
| 1 | 10 | 2 | 50 | |
| 2 | 10 | 1 | 40 | |
| 3 | 10 | 0 | 30 | |
| 4 | 10 | 0 | 30 | ERROR |

FIG. 10

EXAMPLE IN WHICH SET REQUEST IS NOT ACCEPTED WHEN REMAINING EXTENSION TIME PERIOD IS EQUAL TO OR SHORTER THAN 30 MINUTES

| NUMBER OF TIMES SET REQUEST HAS BEEN RECEIVED | SET EXTENSION TIME PERIOD (MINUTES) | NUMBER OF TIMES OF EXTENSION (REMAINING) | EXTENSION TIME PERIOD (REMAINING) (MINUTES) | |
|---|---|---|---|---|
| 0 | - | 10 | 60 | INITIAL STATE |
| 1 | 15 | 9 | 45 | |
| 2 | 15 | 8 | 30 | 1001 |
| 3 | 15 | 8 | 30 | ERROR |

FIG. 11

EXAMPLE IN WHICH EXTENSION TIME PERIOD IS
ADJUSTED IN RELATION TO TIME SET BY WEEKLY TIMER
IN WEEKLY TIMER, 18:00 IS SET FOR MONDAY

1101 → | TIME | EXTENSION TIME PERIOD (REMAINING) (MINUTES) | ← 1102

| TIME | EXTENSION TIME PERIOD (REMAINING) (MINUTES) |
|---|---|
| 17:00 | 60 |
| 17:15 | 45 |
| 17:30 | 30 |
| 17:55 | 5 |

1103        1104

IMAGE FORMING APPARATUS, CONTROL METHOD THEREFOR, AND STORAGE MEDIUM

BACKGROUND OF THE INVENTION

1. Field of the Invention

The present invention relates to an image forming apparatus, a control method and a storage medium.

2. Description of the Related Art

One recent strategy to save power on a device connected to a network is to switch the device to a sleep mode when a predetermined time period has elapsed without the device being used. Also, a management method is used whereby, when a sleep mode has continued for a predetermined time period, the power is automatically shut down (automatic shutdown).

When an image forming apparatus is in a sleep mode, polling and the like used by a management application in a network does not cause the image forming apparatus to return from the sleep mode, and the sleep mode continues for a predetermined time period. Accordingly, the power of the image forming apparatus is automatically shut down based on a timer value that has been accumulated since the image forming apparatus initially switched to the sleep mode. Based on the assumption of using an image forming apparatus from a plurality of computers connected to a network, Japanese Patent Laid-Open No. 2007-079925 suggests a peripheral apparatus with a temporary power-off lock function, which allows locking a power-off function executed using a power-off command and the like for a predetermined time period. For example, this can prevent a problematic situation where, when a user of a computer is attempting to use the image forming apparatus with the execution of the temporary power-off lock function, the power of the image forming apparatus is suddenly turned off due to another user transmitting a power-off command to the image forming apparatus without notification.

However, the above conventional technology has the following problems. When an image forming apparatus is operated by a management application via a network, some operations can be executed while the image forming apparatus is in a sleep mode. Examples of such operations include an operation to download font resources, distribution of updates for firmware of the image forming apparatus, acquisition of information from apparatuses, and writing of data from the management application to the image forming apparatus, e.g. a process for synchronizing address books. During the above processes, the sleep mode is maintained, and therefore there is a possibility that the sleep mode is determined to have continued for a certain time period and the automatic shutdown is executed. If the automatic shutdown is executed during the above processes, data inconsistency occurs easily, thus giving rise to the possibility that functional problems occur when, for example, turning on the power of the image forming apparatus the subsequent time.

In addition, in the form of sleep notification using a service location protocol (SLP), the image forming apparatus notifies computers in the network of the state thereof upon switching to the sleep mode, upon returning from the sleep mode, and upon shutting down. Depending on the timing of communication from the management application to the image forming apparatus, notification regarding the shutdown may be received immediately after notification regarding the return from the sleep mode. In this case, there is a possibility that the management application cannot execute a process that accompanies the shutdown process of the image forming apparatus in time.

To solve these problems, the above conventional technology suggests the use of the temporary power-off lock function. However, the conventional technology ultimately gives rise to the problem that the power cannot be turned off when a plurality of computers in the network keep setting a temporary power-off lock command for the image forming apparatus. Moreover, when the automatic shutdown is set in view of power saving, the premise is that the automatic shutdown will definitely be executed sometime, and therefore the power cannot be turned off. This is problematic in view of power saving.

SUMMARY OF THE INVENTION

The present invention enables realization of an image forming apparatus that allows the extending of an automatic shutdown function and restricts the number of times such an extension is performed and an extension time period, as well as realization of a control method therefor and a storage medium.

One aspect of the present invention provides an image forming apparatus that executes automatic shutdown when a predetermined time period has elapsed since a start of a sleep mode in which power-saving control is executed, the image forming apparatus comprising: a storage unit configured to store the number of extensions, which is the number of times an automatic shutdown time can be extended, and an extension time period by which the automatic shutdown time can be extended; a reception unit configured to receive a set request for requesting extension of the automatic shutdown from an external apparatus communicably connected to the image forming apparatus; and a control unit configured to enable settings of the set request received by the reception unit when the set request satisfies conditions regarding the number of extensions and the extension time period stored in the storage unit, and to disable the settings of the set request when the set request does not satisfy the conditions regarding the number of extensions and the extension time period stored in the storage unit.

Another aspect of the present invention provides a control method for an image forming apparatus that executes automatic shutdown when a predetermined time period has elapsed since a start of a sleep mode in which power-saving control is executed, and that includes a storage unit storing the number of extensions, which is the number of times an automatic shutdown time can be extended, and an extension time period by which the automatic shutdown time can be extended, the control method comprising: causing a reception unit to receive a set request for requesting extension of the automatic shutdown from an external apparatus communicably connected to the image forming apparatus; and causing a control unit to enable settings of the set request received in the reception step when the set request satisfies conditions regarding the number of extensions and the extension time period stored in the storage unit, and to disable the settings of the set request when the set request does not satisfy the conditions regarding the number of extensions and the extension time period stored in the storage unit.

Further features of the present invention will be apparent from the following description of exemplary embodiments with reference to the attached drawings.

BRIEF DESCRIPTION OF THE DRAWINGS

FIG. 3 shows an example of shutdown-related settings performed through an operation unit 140 in the present embodiment.

FIG. 7 shows an information table that is used in replying to an SNMP Set request in the present embodiment (a normal case).

FIG. 8 shows an information table that is used in replying to an SNMP Set request in the present embodiment (the case where a set extension time period exceeds a remaining extension time period).

FIG. 9 shows an information table that is used in replying to an SNMP Set request in the present embodiment (the case where a Set request is issued after the remaining number of extensions reached zero).

FIG. 10 shows an information table that is used in replying to an SNMP Set request in the present embodiment (the case where a Set request is not accepted when a remaining extension time period is equal to or shorter than a predetermined time period).

FIG. 11 shows an information table that is used in replying to an SNMP Set request in the present embodiment (in relation to a weekly timer).

DESCRIPTION OF THE EMBODIMENTS

Figure 1:
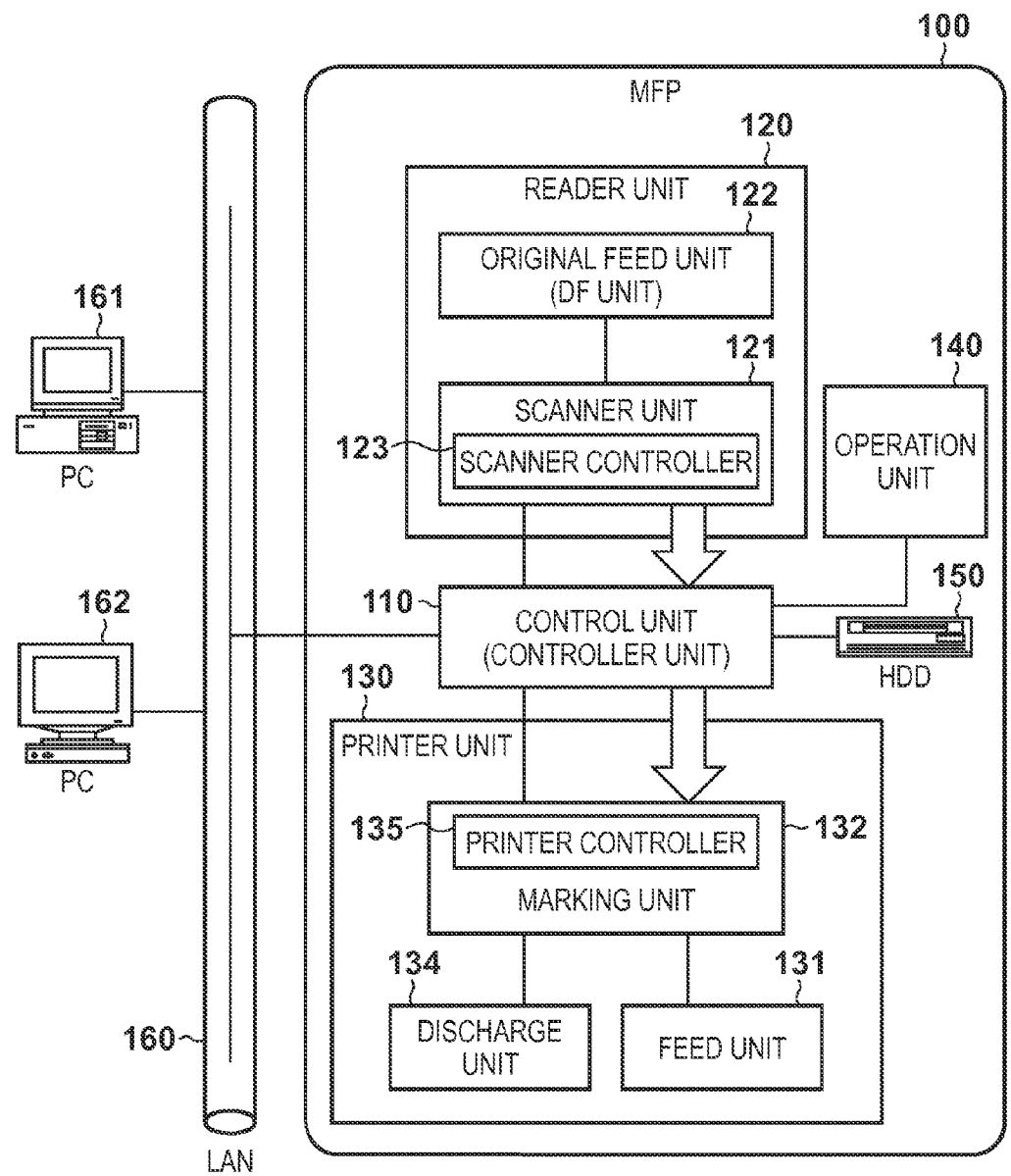
FIG. 1 shows an example of a configuration of a system including an image forming apparatus 100 according to the present embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Forming Apparatus>

The following describes one embodiment of the present invention with reference to FIGS. 1 to 12. In the present embodiment, a multifunction peripheral (MFP) that has a plurality of functions such as a copy function and a printer function is described as one example of an image forming apparatus. Note, however, that the present invention is not limited in this way. A single-function peripheral (SFP) that has only a copy function or a printer function may be used as the image forming apparatus. First, a description is given of an example of a configuration of an MFP 100 with reference to FIG. 1.

The MFP 100 includes a controller unit (control unit) 110, a reader unit 120, a printer unit 130, an operation unit 140, and a hard disk drive (HDD) 150. The control unit 110 is electrically connected to and receives data from the reader unit 120 and the printer unit 130. The control unit 110 also transmits various types of commands to the reader unit 120 and the printer unit 130. Furthermore, the control unit 110 is connected to PCs 161 and 162 via a network 160, and receives image data and control commands from the PCs 161 and 162. The network 160 is constructed by, for example, Ethernet (registered trademark). For example, the PCs 161 and 162 monitor apparatus configuration information and current status information for the MFP 100.

The reader unit 120 optically reads an image of the original and converts the read image to image data. The reader unit 120 includes a scanner unit 121 that has a function of reading the original and an original feed unit 122 that conveys the original to a position where the original can be read by the scanner unit 121. A scanner controller 123 included in the scanner unit 121 controls the scanner unit 121 and the original feed unit 122 based on instructions from the control unit 110.

The printer unit 130 includes a feed unit 131 that houses papers (or recording materials) on which an image is to be formed (printed), a marking unit 132 that transfers and fixes image data onto the papers, and a discharge unit 134 that discharges the papers on which the image data has been printed. Based on instructions from the control unit 110, the printer unit 130 feeds the papers in the feed unit 131 to the marking unit 132, causes the marking unit 132 to print image data on the fed papers, and discharges the papers on which the image data has been printed to the discharge unit 134. The discharge unit 134 can, for example, sort and staple the papers on which the image data has been printed by the marking unit 132. The feed unit 131 includes a plurality of feed sections. Each feed section is mounted (set) with papers housed therein. The feed sections can house a plurality of types of papers such as regular papers and glossy papers. The feed sections can also house the papers on which the image data has been printed in the printer unit 130 of the MFP 100 again. Examples of the feed sections include feed cassettes, feed decks and manual feed trays. Note that the feed sections are not limited to the above forms as long as they can convey the papers housed therein to the marking unit 132.

The operation unit 140 includes, for example, hardware keys, a liquid crystal display unit and a touchscreen unit attached to the surface of the liquid crystal display unit, and receives instructions from a user via these components. Furthermore, the operation unit 140 can display software keys as well as the functions and the state of the MFP 100 on the liquid crystal display unit. The operation unit 140 also transmits commands corresponding to the instructions from the user to the control unit 110. The HDD 150 stores various types of settings of the MFP 100 and image data.

With the above configuration, the MFP 100 realizes various types of functions such as a copy function, an image data transmission function and a printer function. In order to realize the copy function, the control unit 110 controls the reader unit 120 to read image data of the original, and controls the printer unit 130 to perform printing on a paper using the read image data. In order to realize the image data transmission function, the control unit 110 converts the image data of the original read by the reader unit 120 to code data, and transmits the code data to the PCs 161 and 162 via the network 160. In order to realize the printer function, the control unit 110 converts code data (print data) received from the PCs 161 and 162 via the network 160 to image data, and transmits the image data to the printer unit 130. Thereafter, the printer unit 130 performs printing on a paper using the received image data. The configuration of the control unit 110 will be described later with reference to FIG. 4.

In the MFP 100 according to the present embodiment, the automatic shutdown is executed when a predetermined time period has elapsed since the MFP 100 switched to a sleep mode in which power-saving control is executed. According to the present embodiment, although the automatic shutdown time can be extended based on a request from an external apparatus that is communicably connected, a certain restriction is placed on such extension. Below is a specific description of control related to the automatic shutdown in the present embodiment.

<Description of Standard Technology>

Figure 2:
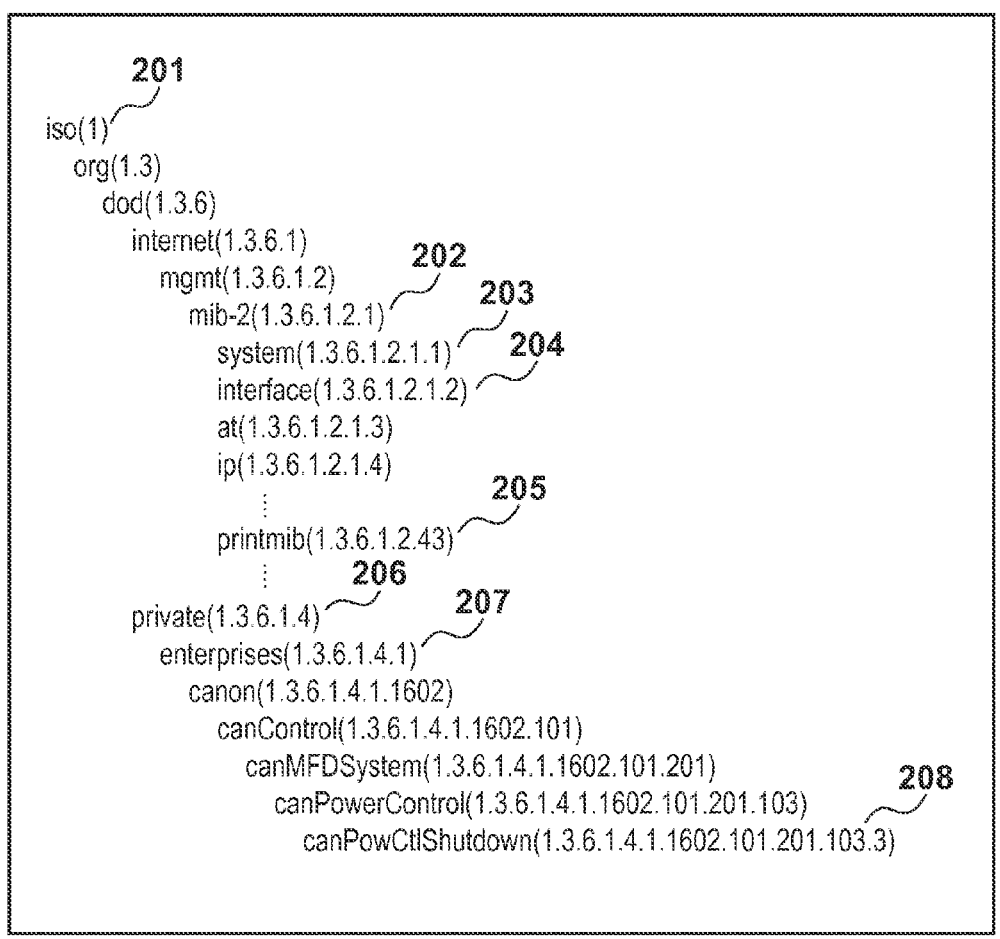
FIG. 2 shows an MIB object arrangement in an MIB tree according to the present embodiment.

A description is now given of acquisition of information from a network apparatus based on a Request for Comments (RFC) that is published by the IETF for the purpose of standardizing the technology applied to the Internet with reference to FIG. 2. In general, the Simple Network Management Protocol (SNMP) is widely used as a protocol for managing information of devices in a network. Network apparatuses managed using SNMP have management information base (MIB) information, and are managed through responses to SNMP requests from a management terminal. The structure of the MIB information has been standardized by the IETF.

The MIB information that can be acquired using SNMP is categorized into the following: MIB information based on the technical specifications/requirements, which is defined by an RFC as a standard, and enterprise MIB information (hereinafter also referred to as private MIB) expanded on a per-company basis. The MIB information includes predetermined object identifiers defined by an RFC. Arrangement in the MIB tree is shown in FIG. 2. On the other hand, the enterprise MIB information is MIB information uniquely defined by companies. The enterprise MIB information is different from standard MIB information defined by an RFC and the like, and is given more added value by companies. The enterprise MIB information can be read by general-purpose SNMP management software by being described in an information structure definition language according to the Abstract Syntax Notation One (ASN.1). Therefore, the MIB information can be interpreted without the additional use of special-purpose software.

As to the whole picture of the MIB tree, ISO has been standardized by the ITU-T. The MIB tree including the MIB information starts with iso(1) with the reference sign 201. The MIB information defined by an RFC is arranged under mib-2(1.3.6.1.2.1) with the reference sign 202. Furthermore, system(1.3.6.1.2.1.1) with the reference sign 203 and interfaces (1.3.6.1.2.1.2) with the reference sign 204 denote a collection of information defined by RFC 1213. RFC 3805, which is a printer-related RFC, defines a collection of information under printmib(1.3.6.1.2.1.43) with the reference sign 205.

On the other hand, the enterprise MIB information is managed under enterprises(1.3.6.1.4.1) with the reference sign 207 arranged under private(1.3.6.1.4) with the reference sign 206, and is assigned different numbers for different companies. Taking advantage of this expansion for companies, the present embodiment uses MIB information of canPowCtLShutdown(1.3.6.1.4.1.1602.101.201.103.3) with the reference sign 208. The following is an example of canPowCtlShutdown described according to the aforementioned ASN.1.

```
        canPowCtlShutdown OBJECT-TYPE
    SYNTAX       OCTET STRING (SIZE(0..15))
    MAX-ACCESS read-write
    STATUS       current
    DESCRIPTION
```

"With this management node, information acquisition and extension settings are performed in relation to automatic shutdown.

There are three types of parameters, which are separated by a : (colon).

Parameters used at the time of Read are as follows.

First parameter: information related to the remaining number of extensions that can be set (in units of times).

Second parameter: information related to the remaining extension time period that can be set (in units of minutes).

Third parameter: a time period until the automatic shutdown (in units of minutes; 9999 when the automatic shutdown is not set).

Parameters used at the time of Write are as follows.

First parameter: fixed to zero.

Second parameter: fixed to zero.

Third parameter: a time period to be extended (in units of minutes).

Parameters used at the time of reply to Write are as follows.

First parameter: information related to the remaining number extensions that can be set (in units of times).

Second parameter: information related to the remaining extension time period that can be set (in units of minutes).

Third parameter: an extension time period that has been successful (in units of minutes).

```
        "
    ::= { canPowerControl 3 }
```

The specifications of the above canPowCtlShutdown described according to ASN.1 are briefly explained below. First of all, canPowCtlShutdown is arranged as the third definition of canPowerControl, which is a tree structure thereabove. The type definition and the size are defined as an octet character string up to 15 bytes. Information can be both read from and written to canPowerControl. When reading information from and writing information to canPowCtlShutdown in practice, parameters described in DESCRIPTION are specifically used. For example, when a value obtained from the MFP 100 at the time of Read is "10:60:55", it means that the remaining number of times the extension settings can be changed is 10, the remaining extension time period is 60 minutes, and a time period until the automatic shutdown is 55 minutes.

<Configuration of Control Unit 110>

Figure 4:
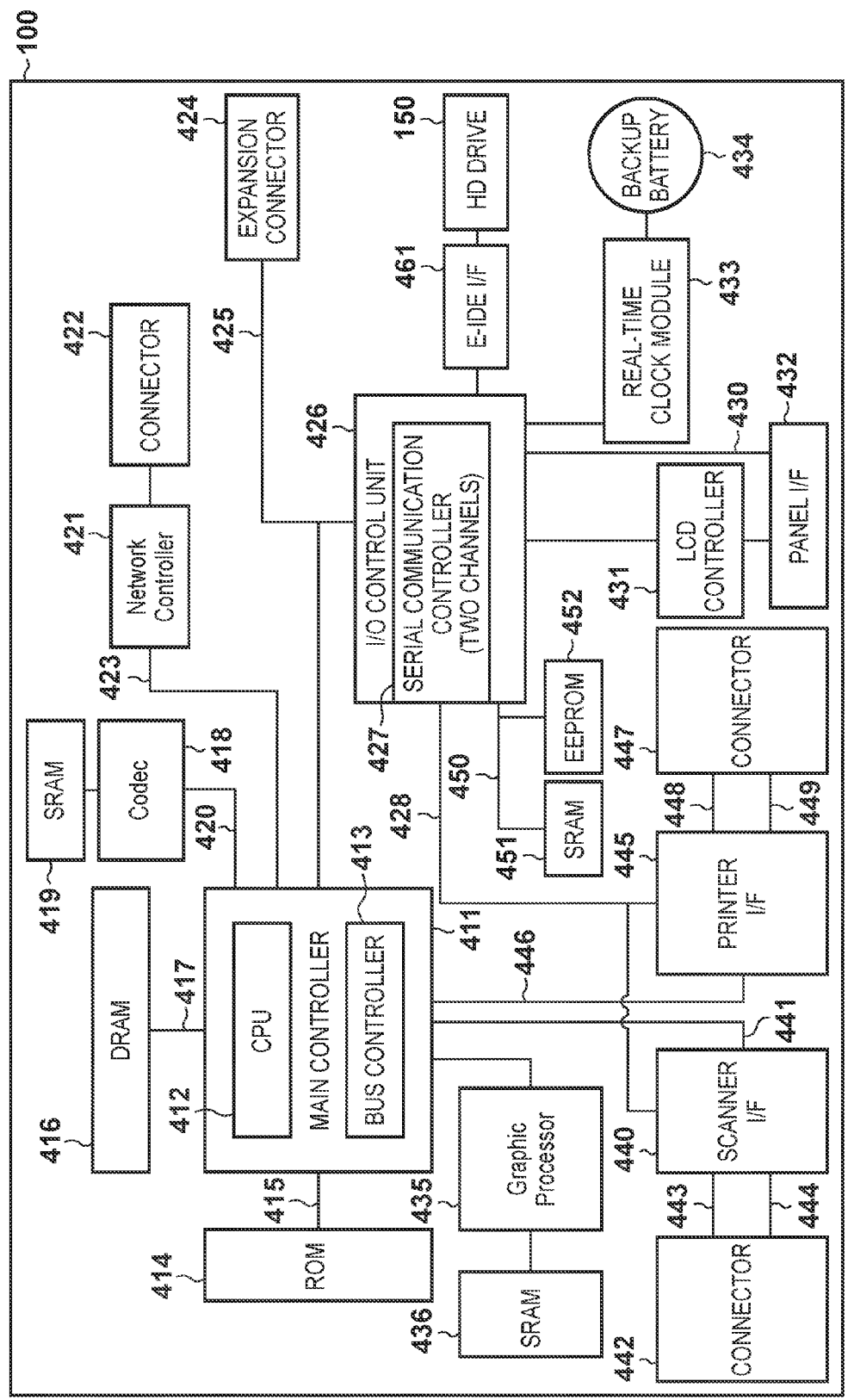
FIG. 4 shows an example of a block configuration of a control unit 110 in the image forming apparatus 100 according to the present embodiment.

A description is now given of an example of a block configuration of the control unit 110 with reference to FIG. 4. A main controller 411 includes a CPU 412, a bus controller 413 and various types of I/F controller circuits. The CPU 412 and the bus controller 413 execute overall control of the entire operations of the control unit 110. The CPU 412 executes various types of operations based on programs read from a ROM 414 via a ROM I/F 415. For example, the CPU 412 interprets code data (e.g., a page description language (PDL)) received from the PC 161 or the PC 162 shown in FIG. 1 based on the read programs. The bus controller 413 executes control related to data transfer via each I/F, e.g. control of bus arbitration and DMA data transfer.

A DRAM 416, which is connected to the main controller 411 via a DRAM I/F 417, is used as a work area for the operations of the CPU 412 and as an area for accumulating image data. A codec 418 executes, for example, processing for compressing raster image data accumulated in the DRAM 416 using methods such as MH, MR, MMR, JBIG and JPEG, or for decompressing code data accumulated in the compressed state into raster image data. An SRAM 419 is used as a temporary work area for the codec 418. The codec 418 is connected to the main controller 411 via an I/F 420. Data transfer between the SRAM 419 and the DRAM 416 is controlled by the bus controller 413 and realized by DMA transfer.

A graphic processor 435 executes image processing such as image rotation, image scaling, color space conversion, and binarization on the raster image data accumulated in the DRAM 416. An SRAM 436 is used as a temporary work area for the graphic processor 435. The graphic processor 435 is connected to the main controller 411 via an I/F 437. Data transfer between the graphic processor 435 and the DRAM 416 is controlled by the bus controller 413 and realized by DMA transfer.

A network controller 421 is connected to the main controller 411 via an I/F 423, and to an external network (e.g. the network 160) via a connector 422. A general-purpose high-speed bus 425 is connected to an I/O control unit 426 and to an expansion connector 424 for connecting to an expansion board. The general-purpose high-speed bus 425 is, for example, a PCI bus. The I/O control unit 426 includes an asynchronous serial communication controller 427 having two channels for transmitting and receiving control commands to and from CPUs in the reader unit 120 and the printer unit 130.

The I/O control unit 426 is connected to a scanner I/F 440 and a printer I/F 445 via an I/O bus 428. A panel I/F 432 is for transmitting data to and receiving data from the operation unit 140. The panel I/F 432 transfers image data transferred from an LCD controller 431 to the operation unit 140. The panel I/F 432 also transfers key input signals that are input via the hardware keys and the touchscreen included in the operation unit 140 to the I/O control unit 426 via a key input I/F 430.

A real-time clock module 433, to which power is supplied from a backup battery 434, updates/stores the date and time managed in the MFP 100. An E-IDE I/F 461 is for connecting to the HDD 150. The CPU 412 stores image data in the HDD 150, or reads image data from the HDD 150, via the E-IDE I/F. The reader unit 120 and the printer unit 130 shown in FIG. 1 are respectively connected to a connector 442 and a connector 447. The connector 442 is connected to the scanner I/F 440 via an asynchronous serial I/F 443 and a video I/F 444. The connector 447 is connected to the printer I/F 445 via an asynchronous serial I/F 448 and a video I/F 449.

The scanner I/F 440 is connected to the reader unit 120 via the connector 442, and to the main controller 411 via a scanner bus 441. The scanner I/F 440 executes predetermined processing on an image received from the reader unit 120. The scanner I/F 440 also outputs control signals generated based on video control signals received from the reader unit 120 to the scanner bus 441. Data transfer from the scanner bus 441 to the DRAM 416 is controlled by the bus controller 413.

The printer I/F 445 is connected to the printer unit 130 via the connector 447, and to the main controller 411 via a printer bus 446. The printer I/F 445 executes predetermined processing on image data output from the main controller 411 and outputs the image data to the printer unit 130. The bus controller 413 controls the transfer of raster image data deployed to the DRAM 416 to the printer unit 130. This raster image data is DMA transferred to the printer unit 130 via the printer bus 446, the printer I/F 445 and the video I/F 449.

An SRAM 451 is a memory that can, due to the power supplied from the backup battery, keep holding the contents stored therein even when the power of the entire MFP 100 has been shut down. The SRAM 451 is connected to the I/O control unit 426 via a bus 450. Similarly, an EEPROM 452 is a memory connected to the I/O control unit 426 via the bus 450.

<Settings of Weekly Timer>

The following describes the settings of a weekly timer related to the automatic shutdown with reference to FIG. 3. The contents shown in FIG. 3 can be set by being displayed on the operation unit 140 that has received a display instruction from the user. The contents to be set by user input are stored in the HDD 150, the SRAM 451 and the like. In FIG. 3, 302 denotes a selection item related to days. The shutdown time for each day is set using 301. In the example of FIG. 3, 303 indicates that the automatic shutdown of the MFP 100 is executed at 18:00 on Monday, and 304 indicates that the time of the automatic shutdown on Saturday is not set. Also, 305 shows one example of an item for setting a certain time period until the automatic shutdown. Specifically, when this certain time period has elapsed without the MFP 100 being used, the automatic shutdown is executed. The example of FIG. 3 shows a selection of the setting whereby shutdown processing is automatically executed when four hours have elapsed without the MFP 100 being used. A relationship between the weekly timer and the automatic shutdown time will be described later with reference to FIG. 11.

<Processing Flow Executed Upon Reception of Get Request>

Figure 5:
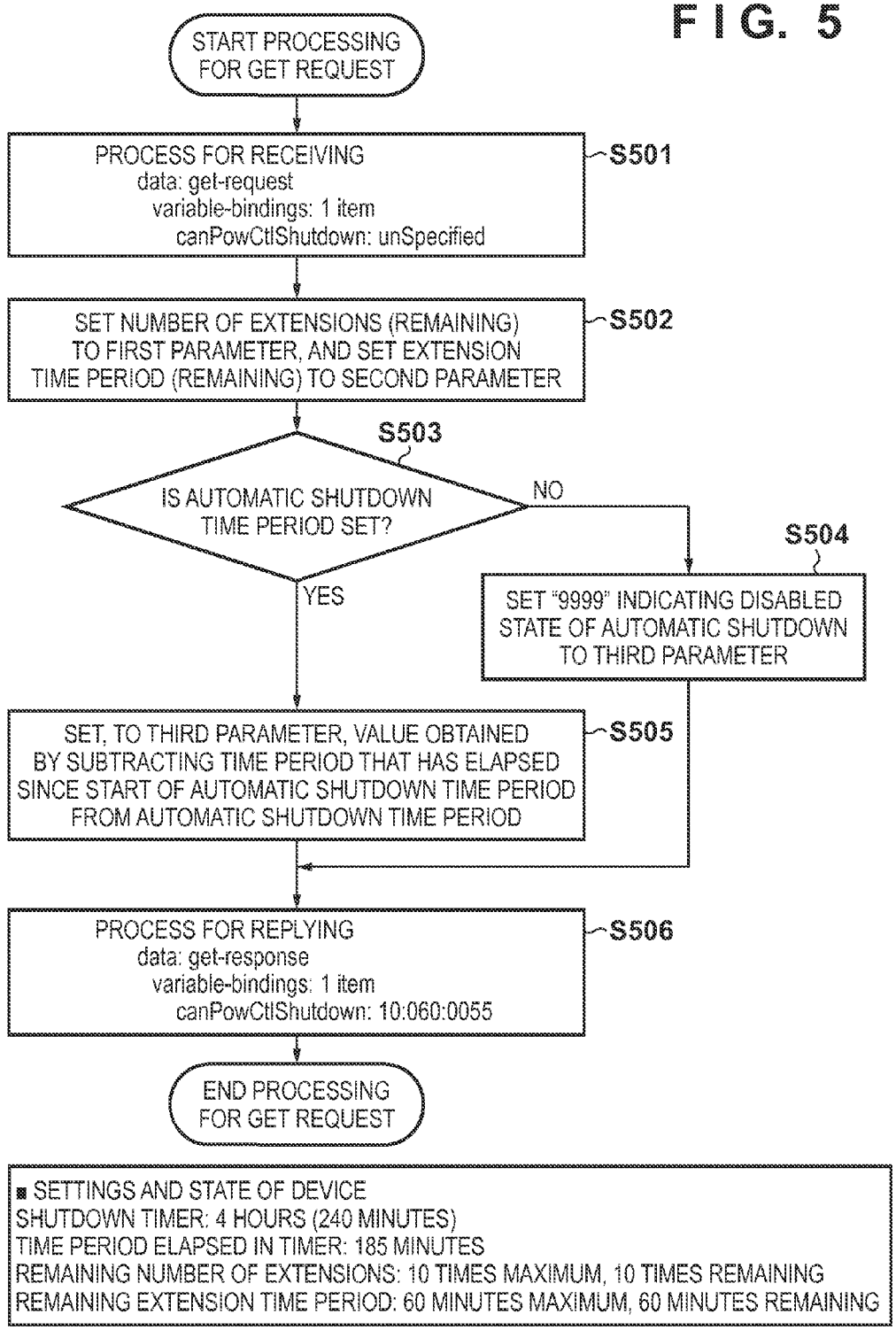
FIG. 5 shows one example of processing executed by the image forming apparatus 100 for an SNMP Get request in the present embodiment.

The following describes a processing flow executed upon receiving a Get request (acquisition request) in the present embodiment with reference to FIG. 5. Note that a Get request is, for example, a request issued by the PC 161 to acquire information related to the current state of the MFP 100. Processes of the steps shown in FIG. 5 are realized, for example, by the CPU 412 reading and executing a program stored in the ROM 414. The processing described below is started upon reception of a packet according to the aforementioned SNMP.

First, in S501, the CPU 412 receives the SNMP packet transmitted from the PC 161. Note that the SNMP packet that the CPU 412 receives is a request packet issued by the PC 161 to acquire information from the MFP 100. This request packet is data used to acquire information of canPowCtlShutdown for packet data. Next, in S502, the CPU 412 confirms that the object identifier (OID) included in the received SNMP packet is canPowCtlShutdown. With reference to the current state 509 of the MFP 100, the CPU 412 also sets the number of extensions to the first parameter and the extension time period to the second parameter based on the specifications of canPowCtlShutdown. In the example of the current state 509 of the MFP 100, 10 is set to the first parameter and 60 is set to the second parameter. Information of 509 showing the settings and the state of the device is stored in the HDD 150, the SRAM 451 and the like.

Then, in S503, the CPU 412 determines whether or not the automatic shutdown time period 305 is set in the MFP 100. When the automatic shutdown time period 305 is not set, the CPU 412 proceeds to S504 and sets 9999, which indicates the disabled (unset) state of the automatic shutdown, to the third parameter based on the specifications of the above canPowCtlShutdown. Thereafter, the CPU 412 proceeds to the process of S506 and executes a response process for the SNMP packet received in S501. Note that the example of the SNMP reply data shown in S506 is for the case where automatic shutdown is set.

On the other hand, when the automatic shutdown time period 305 is set, the CPU 412 proceeds to S505. In S505, the CPU 412 subtracts a time period that has elapsed since the start of the set automatic shutdown time period from the set automatic shutdown time period using time information of the real-time clock module 433, and sets a value obtained through this subtraction to the third parameter. In the example of the current state 509 of the MFP 100, a value obtained by subtracting 185 minutes, which is a time period that has elapsed so far since the start of the automatic shutdown time period (time period elapsed in the timer), from 4 hours (240 minutes) is 55 (minutes), and therefore 55 (minutes) is set to the third parameter. Thereafter, the CPU 412 proceeds to S506. In S506, the CPU 412 sets the first, second and third parameters as reply values based on the specifications of canPowCtlShutdown, and executes a reply process in response to the SNMP packet received in S501. After the SNMP reply process in S506, the CPU 412 ends the processing for the information acquisition request from the PC 161 (processing for the Get request).

<Processing Flow Executed upon Reception of Set Request>

Figure 6:
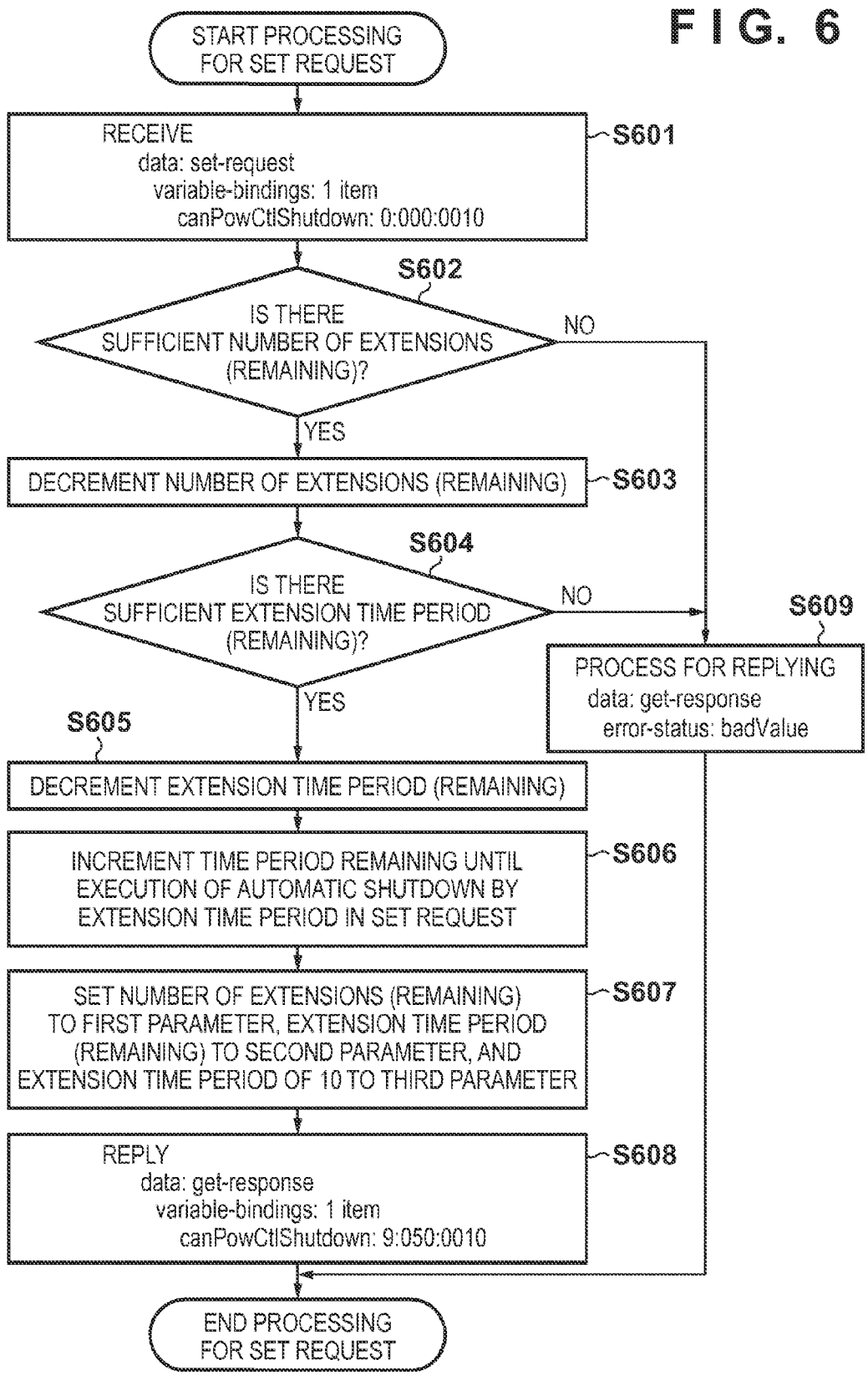
FIG. 6 shows one example of processing executed by the image forming apparatus 100 for an SNMP Set request in the present embodiment.

The following describes a processing flow executed when the PC 161 issues a Set request for requesting the extension of the automatic shutdown to the MFP 100 with reference to FIG. 6. Note that a Set request is, for example, a request issued by the PC 161 to set an automatic shutdown time period in the MFP 100. Processes of the steps shown in FIG. 6 are realized, for example, by the CPU 412 reading and executing a program stored in the ROM 414. The processing described below is started upon reception of a packet according to the aforementioned SNMP.

In S601, the CPU 412 receives the SNMP packet transmitted from the PC 161. Note that the SNMP packet that the CPU 412 receives is a request packet (Set request) issued by the PC 161 to set information in the MFP 100. This request packet is data used to set information of canPowCtlShutdown for packet data. The CPU 412 confirms that the object identifier (OID) included in the received SNMP packet is canPowCtlShutdown, and proceeds with the extension processes. More specifically, the CPU 412 analyzes the received set data based on the specifications of the above canPowCtlShutdown and extracts the third parameter. Next, in S602, the CPU 412 determines whether or not a sufficient number of times the automatic shutdown can be extended is left. When the number of times the automatic shutdown has been extended has reached a predetermined upper limit, the CPU 412 proceeds to S609. In S609, the CPU 412 executes a reply process in response to reception of the SNMP packet showing the Set request using error codes such as badValue indicating that the setting could not be performed.

On the other hand, when the CPU 412 determines that the automatic shutdown can be extended in S602, the CPU 412 proceeds to S603 and decrements the remaining number of extensions (by one). Thereafter, in S604, the CPU 412 determines whether or not a sufficient extension time period is left based on comparison between the extension time period currently remaining and the third parameter in canPowCtlShutdown extracted in S601. When a sufficient time period by which the automatic shutdown can be extended is not left, the CPU 412 proceeds to S609 and executes a reply process in response to reception of the SNMP packet showing the Set request in S601 using error codes such as badValue indicating that the setting could not be performed.

On the other hand, when the CPU 412 determines that the automatic shutdown can be extended in S604, the CPU 412 determines that the settings of the Set request satisfy conditions regarding the number of extensions and the extension time period, and proceeds to S605. In S605, the CPU 412 decrements the remaining extension time period. Then, the CPU 412 proceeds to S606 and increments the time period remaining until the automatic shutdown by the extension time period set to the third parameter in canPowCtlShutdown extracted in S601. As a result, the time period remaining until the automatic shutdown is extended.

Subsequently, in S607, the CPU 412 sets the remaining number of extensions and the remaining extension time period calculated in S603 and S605 to the first parameter and the second parameter in canPowCtlShutdown, respectively.

As the extension has been successfully set, the CPU 412 also sets this successful extension time period to the third parameter. Thereafter, in S608, the CPU 412 sets the above first, second and third parameters as reply values based on the specifications of canPowCtlShutdown, and executes a reply process in response to the SNMP packet received in S601. After the SNMP response process in S608, the CPU 412 updates 509 stored in the HDD 150 or the SRAM 451 using the information updated in the processes of S603, S605 and S606 (information that reflects the settings of the Set request). Then, the CPU 412 ends the processing for the information acquisition request from the PC 161 (processing for the Set request).

<Extension of Automatic Shutdown Time Period>

With reference to FIGS. 7 to 11, the following describes in more detail how the extension is performed through the processing flow described above with reference to FIG. 6. FIG. 7 shows a normal case.

In FIG. 7, 701 denotes the number of times the CPU 412 received a Set request for extension in S601, and 702 denotes an extension time period corresponding to the third parameter included in canPowCtlShutdown when the CPU 412 received the Set request for extension in S601. Also, 703 denotes the remaining number of times the extension can be performed, and 704 denotes a remaining time period by which the automatic shutdown can be extended. In FIG. 7, 705 shows one example of an initial state that takes place when the power of the MFP 100 is turned on. In this initial state that follows immediately after the power of the MFP 100 is turned on, the number of times the CPU 412 received the Set request for extension in S601 is zero, and the extension time period 702 is disabled because an SNMP packet has not been received. According to the example of this initial state, an initial value of the remaining number of times the extension can be performed is 10, and an initial value of the remaining time period by which the automatic shutdown can be extended is 60 minutes. Note that upon receiving an instruction from the user, the operation unit 140 can re-set the initial value of the number of times of extension and the initial value of the extension time period with respect to the control unit 110.

In the example of FIG. 7, extension of 10 minutes is set by the Set requests received for the first, second and third times. Each time a Set request succeeds, the remaining number of times of extension and the remaining extension time period are decremented. An extension time period of 0 minutes is set by the Set request received for the fourth time. In this case, the extension time period does not change, and therefore the remaining number of times of extension and the remaining extension time period do not change.

FIG. 8 shows an example in which the set extension time period exceeds the remaining extension time period. With reference to the example of FIG. 8, the following describes the case where it is determined in the process of S604 that the extension time period set by the Set request from the PC 161 exceeds the remaining extension time period. Note that the basic configuration of FIG. 8 is similar to FIG. 7. The PC 161 has set an extension time period of 15 minutes, 30 minutes and 10 minutes for the first, second and third times, respectively. As a result, 801 indicates the remaining extension time period of 5 minutes. When the PC 161 has set the extension for the fourth time in this state, if the set extension time period is 10 minutes as indicated by 802, then the set extension time period exceeds the remaining extension time period 801. Therefore, as a result of determination in S604, the Set request is determined to be an error request, and the processing moves to S609. When the Set request is determined to be an error request, the extension of the automatic shutdown is not performed, and therefore the remaining number of times of extension and the remaining extension time period are not decremented as indicated by 803 and 804.

FIG. 9 shows an example in which a Set request is received after the remaining number of times of extension has reached zero. With reference to the example of FIG. 9, the following describes the case where it is determined in the process of S602 that the PC 161 has issued a Set request after the remaining number of times of extension has reached zero. Note that the basic configuration of FIG. 9 is similar to FIG. 7. Assume that the PC 161 has already set the extension time period three times. An initial value of the remaining number of times of extension is three. In this state, once the PC 161 sets the extension for the third time, the remaining number of times of extension reaches zero as indicated by 901. Therefore, when the extension time period set for the fourth time is 10 minutes as indicated by 902, a sufficient extension time period is still left, but the upper limit of the number of times of extension has been reached (the remaining number of times of extension is zero). That is to say, as a result of determination in S602, the Set request is determined to be an error request, and the processing moves to S609. When the Set request is determined to be an error request, the extension of the automatic shutdown is not performed, and therefore the remaining number of times of extension and the remaining extension time period are not decremented as indicated by 902 and 903.

FIG. 10 shows an example in which a Set request is not accepted when the remaining extension time period is equal to or shorter than a predetermined time period. With reference to the example of FIG. 10, the following describes the case where it is determined in the process of S604 that the time period remaining until the automatic shutdown is equal to or shorter than a predetermined time period that has been set by the operation unit 140. In the example of FIG. 10, the predetermined time period that has been set by the operation unit 140 in advance is 30 minutes. The PC 161 has set an extension time period of 15 minutes for both the first time and the second time. As a result, 1001 indicates a remaining extension time period of 30 minutes. When the remaining time period reaches 30 minutes, that is to say, the predetermined time period, it is necessary to reject the extension. When the extension time period set by the PC 161 for the third time is 15 minutes (1002) while the remaining extension time period is 30 minutes (1001), the CPU 412 determines that the setting cannot be performed and proceeds to S609. When the Set request is determined to be an error request, the extension of the automatic shutdown is not performed, and therefore the remaining number of times of extension and the remaining extension time period are not decremented as indicated by 1003 and 1004. As has been described above, when the remaining extension time period becomes shorter than a predetermined time period, the MFP 100 according to the present embodiment can reject the subsequent Set requests. That is to say, in the example of FIG. 10, the Set request issued for the third time, which should be acceptable because it satisfies the conditions regarding the remaining number of times of extension and the remaining extension time period, is not accepted because the remaining extension time period is equal to or shorter than 30 minutes.

FIG. 11 shows a relationship with the weekly timer. The following describes a relationship between the shutdown time for each day set by the weekly timer shown in FIG. 3 and the remaining extension time period. In the example of FIG. 11, the shutdown time set by the weekly timer for Monday is 18:00, and the remaining extension time period is 60 minutes. In FIG. 11, 1101 denotes time. At 17:00, the remaining extension time period is 60, and therefore the extension can be set. Meanwhile, because the shutdown at the time set by the weekly timer is given priority over the automatic shutdown, the CPU 412 executes processing for correcting the remaining extension time period as time 1101 elapses. For example, the CPU 412 keeps correcting the remaining extension time period 1104 over time 1103. Although the above has described the example in which the time set by the weekly timer is given priority over the automatic shutdown time period, the present invention is not limited in this way. Alternatively, the automatic shutdown time period may be given priority over the time set by the weekly timer. That is to say, in the present embodiment, either the shutdown time for each day or the above-described extension time period is given priority as the maximum extension time.

<Set Request Reception Processing>

Figure 12:
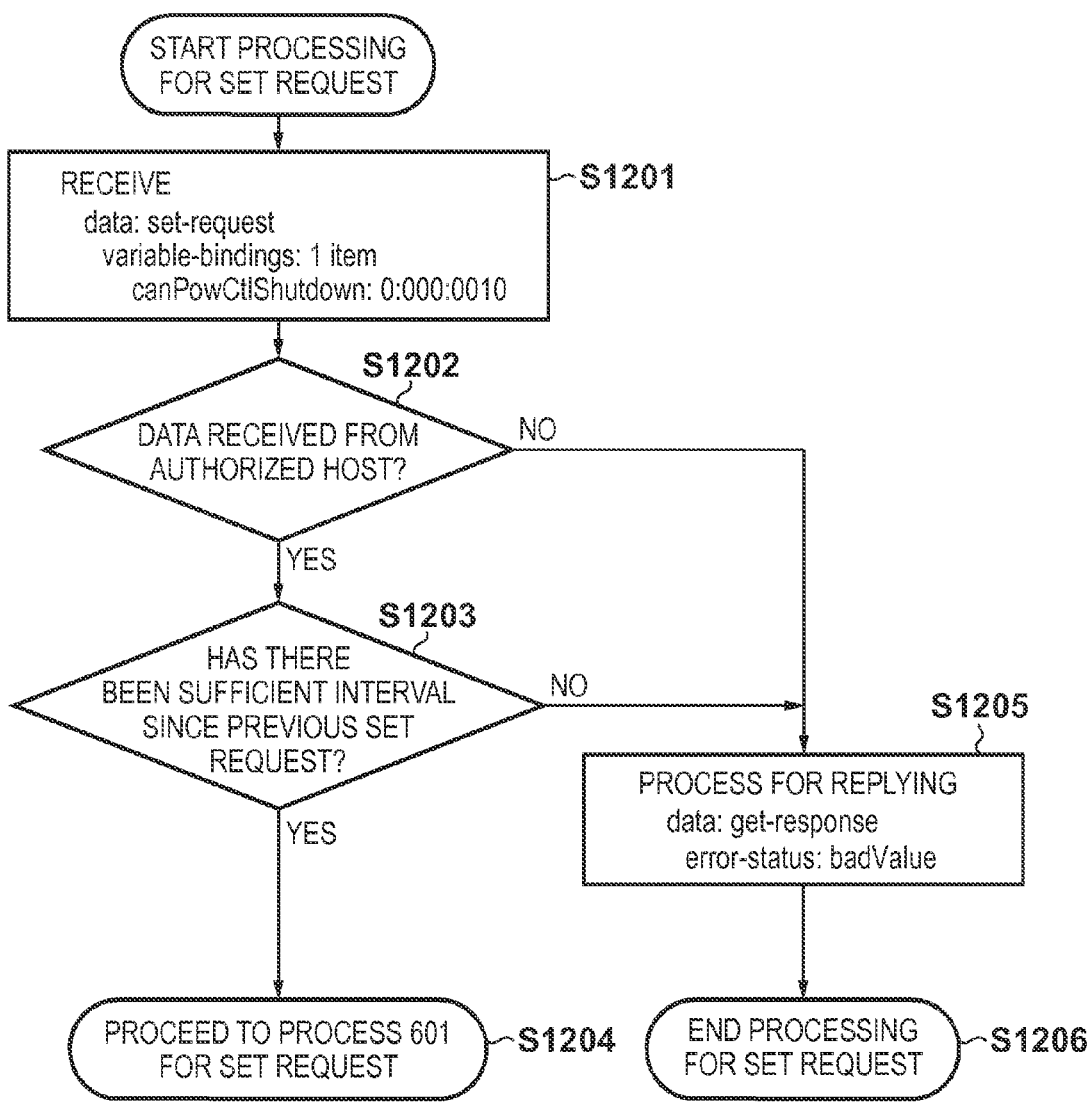
FIG. 12 shows one example of processing executed by the image forming apparatus 100 for an SNMP Set request in the present embodiment.

A description is now given of Set request reception processing executed before the process of S601 with reference to FIG. 12. Processes of the steps shown in FIG. 12 are realized, for example, by the CPU 412 reading and executing a program stored in the ROM 414. The processing described below is started upon reception of a packet according to the aforementioned SNMP.

In S1201, the CPU 412 receives the SNMP packet transmitted from the PC 161. Note that in the example of FIG. 12, the SNMP packet that the CPU 412 receives is a request packet issued by the PC 161 to set information in the MFP 100. Next, in S1202, the CPU 412 determines whether or not packet data is from a host that has been authorized to set the extension. The CPU 412 makes this determination based on comparison with, for example, an IP address and a MAC address (identifiers of external apparatuses) that have been set by the operation unit 140 in advance. When the CPU 412 determines that the extension is set by an unauthorized host, the CPU 412 proceeds to S1205 and executes a reply process in response to reception of the SNMP packet showing the Set request in S1201 using error codes such as badValue indicating that the setting could not be performed. Then, the CPU 412 proceeds to S1206 and ends the processing for the information acquisition request from the PC 161 (processing for the Set request). That is to say, the image forming apparatus according to the present embodiment receives only requests from external apparatuses having predetermined identifiers as requests to process, and returns error for other requests without processing the same.

On the other hand, when the CPU 412 determines in S1202 that the extension is set by an authorized host, the CPU 412 proceeds to the process of S1203. In S1203, the CPU 412 determines whether or not the extension setting has been performed at an interval longer than an interval of the extension setting set by the operation unit 140 in advance. The purpose of this determination process is to prevent, for example, malfunction of the MFP 100 caused by repetition of the extension setting in a short period of time. When the CPU 412 determines in S1203 that the extension setting has been performed at a short interval, the CPU 412 proceeds to S1205. In S1205, the CPU 412 executes a reply process in response to reception of the SNMP packet showing the Set request in S1201 using error codes such as badValue indicating that the setting could not be performed.

On the other hand, when the CPU 412 determines in S1203 that there has been a sufficient interval since the extension setting was performed by the Set request previously received, the CPU 412 proceeds to S1204, which is followed by the process of S601. Note that whether or not the determination in S1202 and S1203 is made on an individual basis may be set.

Specifically, the determination in S1202 and S1203 may be enabled or disabled depending on the environment in which the MFP 100 is set.

As has been described above, the image forming apparatus (MFP 100) according to the present embodiment can achieve the following effects. A unit is provided that not only performs notification regarding information of a time period until the automatic shutdown, but also extends the automatic shutdown within a preset range. Therefore, when a sufficient number of times of extension and a sufficient extension time period are left, the automatic shutdown can be extended in order to complete desired data processing between a management application in the network and the image forming apparatus, thus improving the usability. When a sufficient number of times of extension and a sufficient extension time period are not left, the management application in the network can take preliminary actions for the shutdown processing of the image forming apparatus. This allows preventing the problem of communication failure during the processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-086850 filed on Apr. 5, 2012, which is hereby incorporated by reference herein in its entirety.

What is claimed is:

1. An image forming apparatus that executes automatic shutdown when an automatic shutdown time period has elapsed since a start of a sleep mode in which power-saving control is executed, the image forming apparatus comprising:
   a storage unit configured to store the number of extensions, which is the number of times the automatic shutdown time period can be extended, and an extension time period by which the automatic shutdown time period can be extended;
   a reception unit configured to receive a set request for requesting extension of the automatic shutdown from an external apparatus communicably connected to the image forming apparatus; and
   a control unit configured to enable settings of the set request received by the reception unit when the set request satisfies conditions regarding the number of extensions and the extension time period stored in the storage unit, and to disable the settings of the set request when the set request does not satisfy the conditions regarding the number of extensions and the extension time period stored in the storage unit and to respond the set request using an error code indicating that the settings could not be performed.

2. The image forming apparatus according to claim 1, wherein
   the storage unit further stores a current automatic shutdown time period, and
   when enabling the settings of the set request, the control unit updates the number of extensions, the extension time period and the automatic shutdown time period in the storage unit to reflect the set request, and transmits the updated number of extensions, extension time period and automatic shutdown time period to the external apparatus.

3. The image forming apparatus according to claim 2, wherein
   the reception unit further receives, from the external apparatus, an acquisition request for requesting acquisition of the number of extensions, the extension time period and the automatic shutdown time period related to the automatic shutdown of the image forming apparatus, and
   when the reception unit receives the acquisition request, the control unit transmits the number of extensions, the extension time period and the automatic shutdown time period stored in the storage unit to the external apparatus as a response.

4. The image forming apparatus according to claim 1, wherein
   when the extension time period becomes shorter than a predetermined time period, the control unit disables the settings of the set request even if the set request satisfies the conditions regarding the number of extensions and the extension time period.

5. The image forming apparatus according to claim 1, wherein
   the storage unit further stores a shutdown time for each day input by a user, and
   the control unit prioritizes either the shutdown time for each day of the week or the extension time period as a maximum extension time period.

6. The image forming apparatus according to claim 1, wherein
   the reception unit receives a request from an external apparatus that does not have a predetermined identifier as an error request that is not to be processed, and receives a request from an external apparatus that has the predetermined identifier as a request that is to be processed.

7. The image forming apparatus according to claim 1, wherein
   a set request that is received by the reception unit before elapse of a predetermined time period since previous reception of a set request is received as an error request that is not to be processed, and a set request that is received by the reception unit after elapse of the predetermined time period since previous reception of a set request is received as a request to be processed.

8. The image forming apparatus according to claim 1, wherein
   communication with the external apparatus is performed using SNMP and MIB information.

9. A control method for an image forming apparatus that executes automatic shutdown when an automatic shutdown time period has elapsed since a start of a sleep mode in which power-saving control is executed, and that includes a storage unit storing the number of extensions, which is the number of times the automatic shutdown time period can be extended, and an extension time period by which the automatic shutdown time period can be extended, the control method comprising:

causing a reception unit to receive a set request for requesting extension of the automatic shutdown from an external apparatus communicably connected to the image forming apparatus; and causing a control unit to enable settings of the set request received in the reception step when the set request satisfies conditions regarding the number of extensions and the extension time period stored in the storage unit, and to disable the settings of the set request when the set request does not satisfy the conditions regarding the number of extensions and the extension time period stored in the storage unit and to respond the set request using an error code indicating that the settings could not be performed.

10. A non-transitory computer-readable storage medium storing a computer program for causing a computer to execute a method of controlling a mobile terminal that executes automatic shutdown when an automatic shutdown time period has elapsed since a start of a sleep mode in which power-saving control is executed, and that includes a storage unit storing the number of extensions, which is the number of times the automatic shutdown time period can be extended, and an extension time period by which the automatic shutdown time period can be extended, the method for controlling comprising:

causing a reception unit to receive a set request for requesting extension of the automatic shutdown from an external apparatus communicably connected to the image forming apparatus; and causing a control unit to enable settings of the set request received in the reception step when the set request satisfies conditions regarding the number of extensions and the extension time period stored in the storage unit, and to disable the settings of the set request when the set request does not satisfy the conditions regarding the number of extensions and the extension time period stored in the storage unit and to respond the set request using an error code indicating that the settings could not be performed.

* * * * *